United States Patent
Wang et al.

(10) Patent No.: US 12,228,093 B2
(45) Date of Patent: Feb. 18, 2025

(54) AIRWAY STRUCTURE, CYLINDER COVER, AND MILLER-PROFILE ENGINE

(71) Applicant: WEICHAI POWER CO., LTD., Shandong (CN)

(72) Inventors: Liyu Wang, Shandong (CN); Huajie Wang, Shandong (CN); Wei Li, Shandong (CN); Yuncheng Gu, Shandong (CN); Shanyong Zhang, Shandong (CN); Jianjiao Zhang, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/733,886

(22) Filed: Jun. 5, 2024

(65) Prior Publication Data

US 2024/0401543 A1 Dec. 5, 2024

(30) Foreign Application Priority Data

Jun. 5, 2023 (CN) .......................... 202310655017.X

(51) Int. Cl.
*F02F 1/42* (2006.01)

(52) U.S. Cl.
CPC ........ *F02F 1/4285* (2013.01); *F02B 2275/32* (2013.01)

(58) Field of Classification Search
CPC ...... F02F 1/4285; F02F 1/4235; F02F 1/4264; F02F 1/42; F02B 2275/32; F02M 35/10091; F02M 35/1015
See application file for complete search history.

(56) References Cited

U.S. PATENT DOCUMENTS

| | | | |
|---|---|---|---|
| 4,744,340 A | * | 5/1988 | Kirby ........................ F01L 3/06 123/188.14 |
| 5,551,392 A | | 9/1996 | Yamaji et al. |

(Continued)

FOREIGN PATENT DOCUMENTS

| | | |
|---|---|---|
| CN | 202768094 U | 3/2013 |
| CN | 108869006 A | 11/2018 |

(Continued)

OTHER PUBLICATIONS

First Office Action of the priority application 202310655017.X mailed Jul. 6, 2023, ISA/CN.

*Primary Examiner* — Grant Moubry
(74) *Attorney, Agent, or Firm* — Yue (Robert) Xu; Apex Attorneys at Law, LLP

(57) ABSTRACT

An airway structure, a cylinder cover and a Miller-profile engine are provided. The airway structure includes an intake duct and an intake valve arranged on an intake side, and an exhaust duct and an exhaust side roof arranged on an exhaust side. An angle of an axis of an intake valve stem relative to an assembly bottom surface of the cylinder cover is a1; an angle between a revolution cone surface of an intake valve disc and the axis of the intake valve stem is a2, an angle between a plane where the exhaust side roof is located and the assembly bottom surface is a3, a lower guide surface of the intake duct close to an intake throat is inclined downward at an angle of a4 relative to the assembly bottom surface. The airway structure satisfies: a3-3°≤a1-a2≤a3+3°; and/or, a4-3°≤a1-a2≤a4+3°.

17 Claims, 5 Drawing Sheets

(56) References Cited

U.S. PATENT DOCUMENTS

2015/0292441 A1* 10/2015 Peters .................. F02D 41/345
                                                        123/445
2017/0234175 A1*  8/2017 Morii ........................ F01L 3/24
                                                        123/188.3

FOREIGN PATENT DOCUMENTS

| CN | 209212376 U |   | 8/2019  |
|----|-------------|---|---------|
| CN | 111749811 A | * | 10/2020 |
| CN | 212642871 U |   | 3/2021  |
| GB | 2310003 A   |   | 8/1997  |
| JP | H04339134 A |   | 11/1992 |
| JP | H07119472 A |   | 5/1995  |
| JP | H09209762 A |   | 8/1997  |
| JP | 2019044631 A|   | 3/2019  |
| KR | 950006233 A |   | 3/1995  |

* cited by examiner

AIRWAY STRUCTURE, CYLINDER COVER, AND MILLER-PROFILE ENGINE

This application claims priority to Chinese Patent Application No. 202310655017.X, titled "AIRWAY STRUCTURE, CYLINDER COVER, AND MILLER-PROFILE ENGINE", filed on Jun. 5, 2023 with the China National Intellectual Property Administration, which is incorporated herein by reference in its entirety.

FIELD

The present application relates to the field of engine technology, and in particular to an airway structure, a cylinder cover, and a Miller-profile engine.

BACKGROUND

For conventional-profile engines, during the intake process, at the end of valve opening period, the valve is fully opened and the airflow is completely determined by the airway. Traditional airway design focuses on the relative area relationship between the outlet and the inlet of the airway. Generally speaking, the airway is tapered. There is generally no problem when this airway structure is applied to a conventional-profile engine. However, when this airway structure is applied to a Miller-profile engine, the Miller-profile engine has notable features that a valve is closed before the end of the intake process and that the opening degree of the valve is significantly smaller than that of the conventional-profile engine. As the opening height of the valve is greatly reduced, the airflow is blocked by the valve, which results in insufficient utilization of intake energy and reduces intake efficiency and tumble ratio.

In view of the above, it is desired for those skilled in the art to solve the problems of low intake efficiency and low tumble ratio of the Miller-profile engine.

SUMMARY

In view of this, there is provided in the present application an airway structure, a cylinder cover, and a Miller-profile engine, which can solve the problems of low intake efficiency and low tumble ratio of the Miller-profile engine.

To achieve at least one of the above objects, the present application provides the following technical solutions.

An airway structure for use in a Miller-profile engine includes:
  an intake duct and an intake valve cooperated with the intake duct, wherein the intake duct and the intake valve are provided on an intake side of a cylinder cover;
  an exhaust duct and an exhaust side roof, which are provided on an exhaust side of the cylinder cover; wherein
  an inclination angle of an axis of an intake valve stem of the intake valve relative to an assembly bottom surface of the cylinder cover is a1, an included angle between a revolution cone surface of an intake valve disc of the intake valve and the axis of the intake valve stem is a2, an included angle between a plane where the exhaust side roof is located and the assembly bottom surface of the cylinder cover is a3, a lower guide surface of the intake duct close to an intake throat of the intake duct is inclined downward relative to the assembly bottom surface, and an inclination angle of the lower guide surface relative to the assembly bottom surface is a4; and the airway structure satisfies: $a3-3° \leq a1-a2 \leq a3+3°$; and/or, $a4-3° \leq a1-a2 \leq a4+3°$.

In an embodiment, a distance between an outlet edge of the lower guide surface and the assembly bottom surface is H; a valve opening height of the intake valve is a preset valve opening height when tumble intensity of tumble formed by intake airflow of the intake duct introduced into a cylinder reaches a preset tumble intensity node; a plane formed by the axis of the intake valve stem of the intake valve and an axis of an exhaust valve stem of an exhaust valve on the exhaust side is an auxiliary plane, and a line formed by intersection of the revolution cone surface of the intake valve disc of the intake valve and the auxiliary plane on an outflow side of the intake valve is an auxiliary line; and H satisfies a design condition that:
  an outflow extension line (8) of the lower guide surface (11) extending from the outlet edge coincides with a corresponding auxiliary line (221) when the intake valve (2) is opened to the preset valve opening height.

In an embodiment, the height difference between the preset valve opening height and a maximum valve opening height of the intake valve is k, and the value range of k is 0.3 to 0.4 times the maximum valve opening height of the intake valve.

In an embodiment, a flow guide cross section of the intake duct close to the intake throat of the intake duct is matched with a cross section of the outflow channel formed on an outflow side of the intake valve.

In an embodiment, the flow guide cross section of the intake duct close to the intake throat of the intake duct is arched.

In an embodiment, an intake seat ring is provided at the intake throat of the intake duct, and the intake seat ring is provided with a downward guide inclined surface in smooth transition to an upper guide surface of the intake duct.

In an embodiment, a guide direction of the downward guide inclined surface is consistent with a guide direction of the upper guide surface of the intake duct.

In an embodiment, the flow cross section of the intake seat ring is in a shape of a long circle, and a length direction of the long circle is perpendicular to an outflow direction of the intake duct.

Compared with the solution introduced in the background, the airway structure applied to a Miller-profile engine according to the present application includes: an intake duct and an intake valve cooperated with the intake duct, which are provided on the intake side of a cylinder cover; and an exhaust duct and an exhaust side roof which are provided on the exhaust side of the cylinder cover, wherein an inclination angle of an axis of an intake valve stem of the intake valve relative to an assembly bottom surface of the cylinder cover is a1, an included angle between a revolution cone surface of an intake valve disc of the intake valve and the axis of the intake valve stem is a2, an included angle between a plane where the exhaust side roof is located and the assembly bottom surface of the cylinder cover is a3, a lower guide surface of the intake duct close to an intake throat of the intake duct is inclined downward relative to the assembly bottom surface, and an inclination angle of the lower guide surface relative to the assembly bottom surface is a4, and the airway structure satisfies: $a3-3° \leq a1-a2 \leq a3+3°$; and/or, $a4-3° \leq a1-a2 \leq a4+3°$. By designing the airway structure in the form of the structure described above, a1 is the inclination angle of the axis of the intake valve stem of the intake valve relative to the assembly bottom surface of the cylinder cover, a2 is the included angle between the revolution cone surface of the intake valve disc of the intake valve and the axis of the intake valve stem, a3 is the included angle between the plane where the exhaust side roof is located and the assembly bottom surface of the cylinder cover, and a4 is the inclination angle of the lower guide surface relative to the assembly bottom surface. Here a plane formed by the axis of the intake valve stem of the intake valve and the axis of the exhaust valve stem on the exhaust side is defined as an auxiliary plane, and a1-a2 is the included angle between a line formed by the intersection of the revolution cone surface of the intake valve disc of the intake valve and the auxiliary plane on the outflow side 12 of the intake valve 2 and the assembly bottom surface of the cylinder cover. Therefore, when the airway structure satisfies the condition of a3-3° ≤a1-a2≤a3+3°, the line formed by the intersection of the revolution cone surface and the auxiliary plane on the outflow side of the intake valve is parallel or approximately parallel to the plane where the exhaust side roof is located, so that when the intake valve is opened, the flow guide direction of an intake channel formed by the intake valve disc of the intake valve and the exhaust side roof is substantially the same as the outflow direction of the intake duct on the outflow side, which improves the intake efficiency. In addition, the airflow on the outflow side can tangentially enter the cylinder from the exhaust side via the exhaust side roof, which increases the tumble ratio. When the airway structure satisfies the condition of a4-3°≤a1-a2≤a4+3°, the line formed by the intersection of the revolution cone surface and the auxiliary plane on the outflow side of the intake valve is parallel or approximately parallel to the flow guide direction of the lower guide surface, so that when the intake valve is opened, most of the airflow in the intake duct can enter the cylinder from the outflow side of the intake valve, which also helps to increase the intake efficiency and tumble ratio.

Further, a cylinder cover is provided according to the present application, which includes the airway structure as described above. Since the airway structure have the above technical effects, the cylinder cover including the airway structure also has the corresponding technical effects, which is not repeated here.

Furthermore, a Miller-profile engine is also provided according to the present application, which includes the cylinder cover as described above. Since the cylinder cover have the above technical effects, the Miller-profile engine including the cylinder cover also has the corresponding technical effects, which is not repeated here.

BRIEF DESCRIPTION OF THE DRAWINGS

In order to more clearly illustrate the technical solutions in the embodiments of the present application or in the conventional technology, the following will briefly introduce drawings required in the description of the embodiments or the conventional technology. Apparently, the drawings in the following description are only some of the embodiments of the present application. For those skilled in the art, other drawings can also be obtained based on these drawings without creative efforts.

Figure 1:
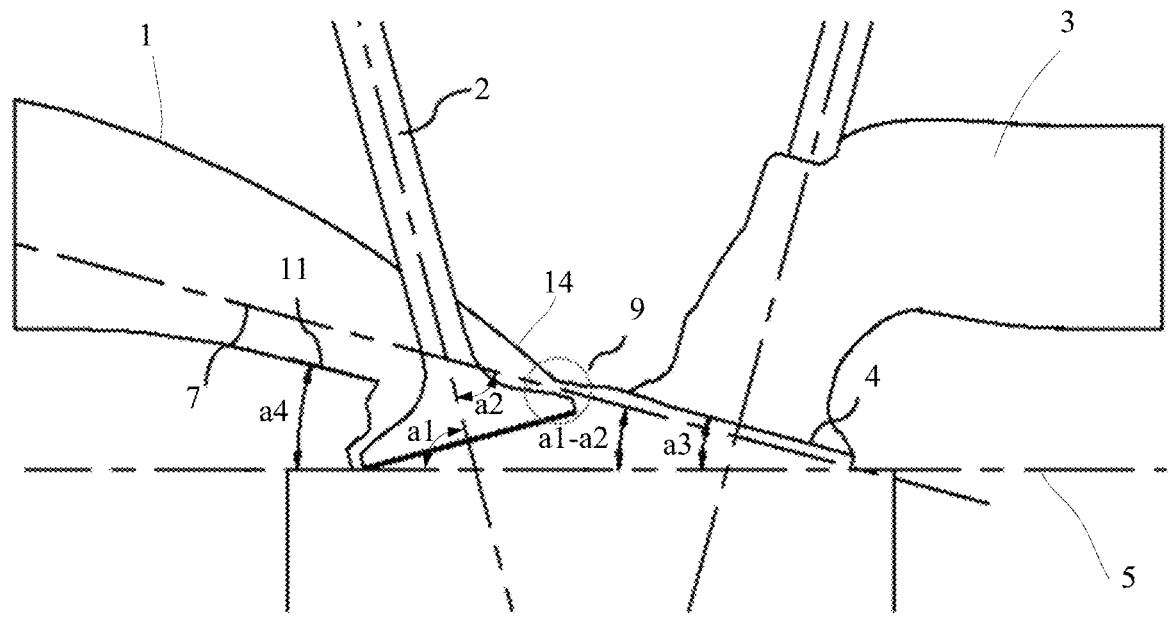
FIG. 1 is an overall schematic view of an airway structure according to an embodiment of the present application.
Figure 2:
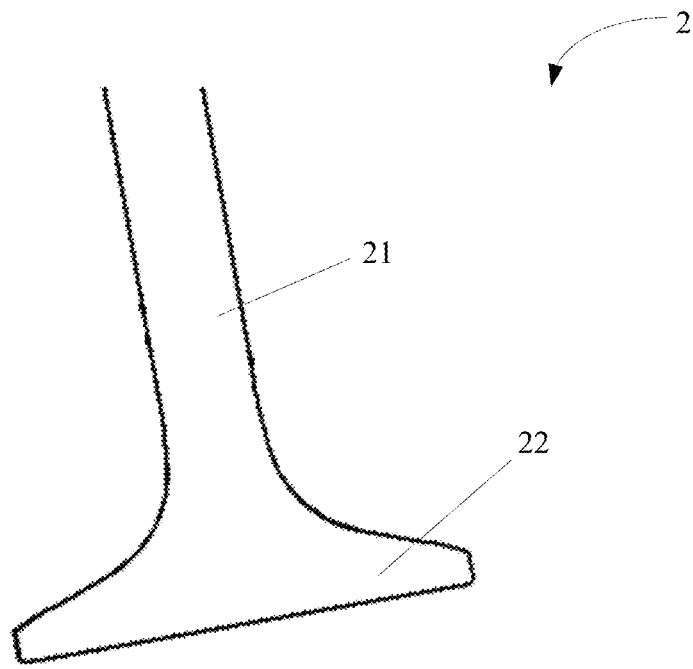
FIG. 2 is a partial schematic view of an intake valve according to an embodiment of the present application.

The reference signs in FIGS. 1 to 9 are listed as follows:
intake duct 1, lower guide surface 11, outflow side 12, flow blocking side 13, upper guide surface 14;
intake valve 2, intake valve stem 21, intake valve disc 22, auxiliary line 221;
exhaust duct 3;
exhaust side roof 4;
assembly bottom surface 5;
intake seat ring 6, downward guide inclined surface 61, length direction 62, width direction 63;
outflow direction 7 of intake duct;
outflow extension line 8;
outflow channel 9; and
flow guide cross section M of intake duct close to intake throat of intake duct.

DETAILED DESCRIPTION OF EMBODIMENTS

The core of the present application is to provide an airway structure, a cylinder cover, and a Miller-profile engine which can solve the problems of low intake efficiency and low tumble ratio of the Miller-profile engine.

The technical solutions in the embodiments of the present application are clearly and comprehensively described below in conjunction with the accompanying drawings. Apparently, the described embodiments are only part of the embodiments of the present application, not all of the embodiments of the present application. Any other embodiment obtained by those skilled in the art based on the embodiments in the present application without creative efforts shall fall within the protection scope of the present application.

It should be noted that the profile of engine valve opening refers to the curve of the opening process of a valve from opening to closing. Taking a four-stroke engine as an example, a Miller-profile engine involves four stages of intake, compression, power, and exhaust. Generally, a conventional-profile engine enables the valve to be in an opened state throughout the intake process, and the opening degree of the valve is large, so as to ensure sufficient air intake. A Miller-profile engine has a notable feature that the valve is closed before the intake process is finished, so that the opening degree of the valve is significantly smaller than that of the conventional-profile engine, that is, the opening height of the valve is greatly reduced. Therefore, the Miller-profile engine generally has the problem that airflow is blocked by the valve, resulting in insufficient utilization of intake energy, low intake efficiency and low tumble flow.

It is proposed an airway structure in the present application, which is applied to a Miller-profile engine, and which can achieve a high tumble ratio under Miller profile, improve flow capacity under Miller profile, and ultimately optimize both flow capacity and tumble flow intensity. As shown in FIGS. 1 to 9, the airway structure includes an intake duct 1, an intake valve 2 matched with the intake duct 1, an exhaust duct 3, an exhaust valve matched with the exhaust duct, and an exhaust side roof 4.

The intake duct 1 and the intake valve matched with intake duct 1 are both arranged on an intake side of a cylinder cover. The exhaust duct 3 and the exhaust side roof 4 are both arranged on the exhaust side of the cylinder cover. The axis of an intake valve stem 21 of the intake valve 2 is inclined at an angle of a1 relative to an assembly bottom surface 5 of the cylinder cover. The angle formed between a revolution cone surface of an intake valve disc 22 of the intake valve 2 and the axis of the intake valve stem 21 is a2. The angle formed between the plane where the exhaust side roof 4 is located and the assembly bottom surface 5 of the cylinder cover is a3. A lower guide surface 11 of the intake duct 1 close to an intake throat of the intake duct 1 is arranged obliquely downward relative to the assembly bottom surface 5, and is at an angle a4 to the assembly bottom surface 5.

The airway structure satisfies: a3-3°≤a1-a2≤a3+3°; and/or, a4-3°≤a1-a2≤a4+3°.

It should be noted that, as understood by those skilled in the art, the assembly bottom surface 5 of the cylinder cover refers to a mating surface of the cylinder cover assembled to a cylinder body.

The airway structure is designed in the form of the structure described above, in which a1 is the inclination angle of the axis of the intake valve stem 21 of the intake valve 2 relative to the assembly bottom surface 5 of the cylinder cover, a2 is the included angle between the revolution cone surface of the intake valve disc 22 of the intake valve 2 and the axis of the intake valve stem 21, a3 is the included angle between the plane where the exhaust side roof 4 is located and the assembly bottom surface 5 of the cylinder cover, and a4 is the inclination angle of the lower guide surface 11 relative to the assembly bottom surface 5. Here a plane formed by the axis of the intake valve stem 21 of the intake valve and the axis of the exhaust valve stem of the exhaust valve 3 on the exhaust side is defined as an auxiliary plane. Thus, a1-a2 is the included angle between a line, which is formed by the intersection of the revolution cone surface of the intake valve disc 22 of the intake valve 2 and the auxiliary plane on the outflow side 12 of the intake valve 2, and the assembly bottom surface 5 of the cylinder cover. Therefore, when the airway structure satisfies the condition of a3-3°≤a1-a2≤a3+3°, the line formed by the intersection of the revolution cone surface and the auxiliary plane on the outflow side 12 of the intake valve 2 is parallel or approximately parallel to the plane where the exhaust side roof 4 is located. Further, when the intake valve 2 is opened, the flow guide direction of an intake channel formed between the intake valve disc 22 of the intake valve 2 and the exhaust side roof 4 is substantially consistent with the outflow direction of the intake valve 2 on the outflow side 12, which helps to improve the intake efficiency. In addition, the airflow on the outflow side can tangentially enter the cylinder from the exhaust side through the exhaust side roof 4, which helps to improve the tumble ratio. When the airway structure satisfies the condition of a4-3°≤a1-a2≤a4+3°, the line formed by the intersection of the revolution cone surface and the auxiliary plane on the outflow side 12 of intake valve 2 is parallel or approximately parallel to the flow guide direction of the lower guide surface 11, so that when the intake valve is opened, most of the airflow in the intake duct can enter the cylinder from the outflow side 12 of the intake valve 2, which also helps to improve the intake efficiency and the tumble ratio.

It should be noted that, if the airway structure, in the actual design process, satisfies one or both of the condition of a3-3°≤a1-a2≤a3+3° and the condition of a4-3°≤a1-a2≤a4+3°, the intake efficiency and the tumble ratio can be improved. If both of the condition of a3-3°≤a1-a2≤ a3+3° and the condition of a4-3°≤a1-a2≤a4+3° are satisfied, the flow guide direction of the lower guide surface 11, the line formed by the intersection of the revolution cone surface and the auxiliary plane on the outflow side of the intake duct 1, and the plane where the exhaust side roof 4 is located are parallel or approximately parallel to each other. When the intake valve is opened, most of the airflow in the intake duct 1 can enter the cylinder from the outflow side 12 of the intake valve 2, which can achieve good intake efficiency and tumble ratio.

Furthermore, it should be noted that, the deviation value ±3° involved in the condition of a3-3°≤a1-a2≤a3+3° and the condition of a4-3°≤a1-a2≤a4+3° is a preferred deviation range of the present application obtained by a large amount of simulation, which can achieve the required intake efficiency and tumble ratio. In the actual design process, if the processing condition allows, the smaller the deviation value, the better. For example, the condition of a3-3°≤a1-a2≤a3+3° may also be changed into a3-1°≤a1-a2≤a3+1°, and the condition of a4-3°≤a1-a2≤a4+3° may also be changed into a4-1°≤a1-a2≤a4+1°. In the actual application, the deviation value may be selected or determined according to actual needs. In addition, the condition of a3-3°≤a1-a2≤ a3+3° and the condition of a4-3°≤a1-a2≤a4+3°, in the actual design process, are generally based on the included angle a1-a2 between the line formed by the intersection of the revolution cone surface and the auxiliary plane on the outflow side 12 of the intake valve 2 and the assembly bottom surface of the cylinder cover.

Figure 4:
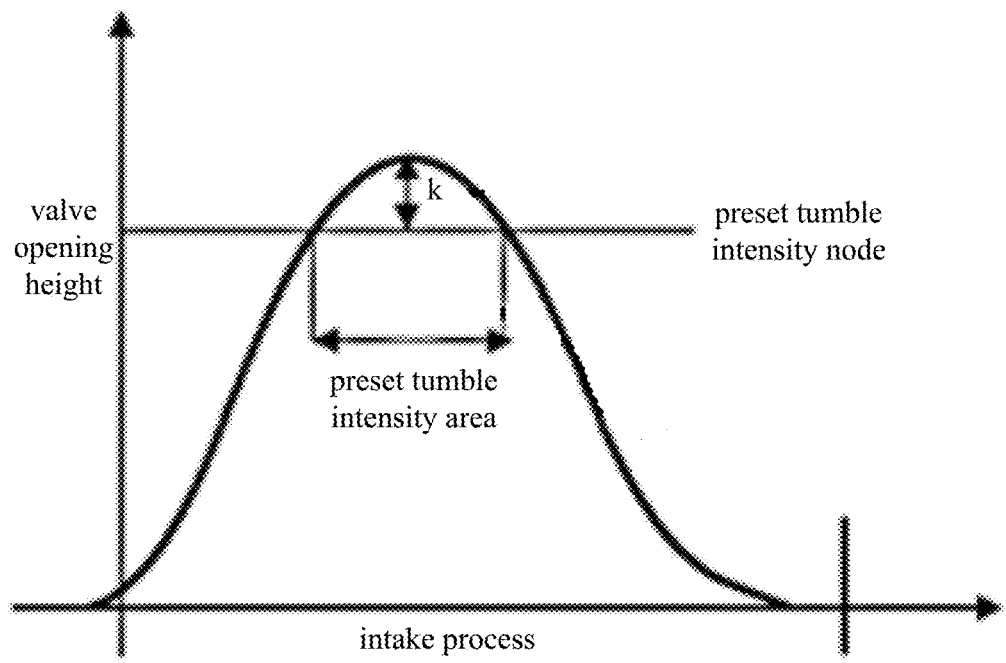
FIG. 4 is a schematic graph showing relation between an intake valve opening height and an intake process, especially, a preset tumble area, with respect to the Miller-profile engine according to an embodiment of the present application.
Figure 5:
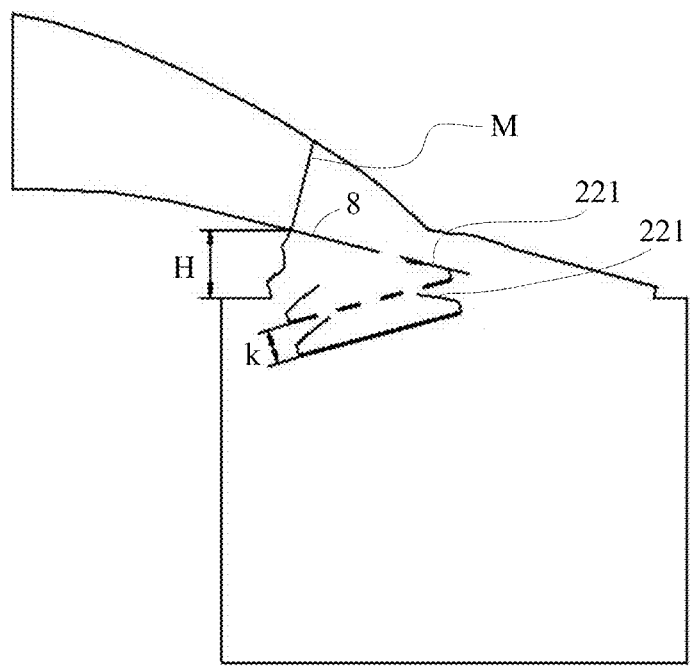
FIG. 5 is a schematic view showing a height difference k between a maximum valve opening height and a preset valve opening height of the intake valve according to an embodiment of the present application.

In an embodiment, referring to FIG. 1 in conjunction with FIGS. 4 and 5, a distance between an outlet edge of the lower guide surface 11 and the assembly bottom surface 5 is H. The intake valve 2 has a preset valve opening height when the intensity of tumble formed by the intake airflow of the intake duct 1 introduced into the cylinder reaches a preset tumble intensity node. The plane formed by the axis of the intake valve stem 21 of the intake valve 2 and the axis of the exhaust valve stem of the exhaust valve on the exhaust side is the auxiliary plane. The line formed on the outflow side 12 of the intake valve 2 by the intersection of the revolution cone surface of the intake valve disc 22 of the intake valve 2 and the auxiliary plane is defined as an auxiliary line 221. H is determined such that: an outflow extension line 8 of the lower guide surface 11 extending from the outlet edge coincides with the auxiliary line 221 when the intake valve 2 is opened to the preset valve opening height. In the actual application, a preset tumble intensity area under the corresponding relationship between the valve opening height of the intake valve 2 and the intake process is determined according to a Miller profile that the airway structure is required to match; the preset valve opening height is then obtained based on the valve opening height corresponding to the preset tumble intensity node; then the angle of the outflow extension line 8 of the lower guide surface 11 extending from the outlet edge can be determined based on the corresponding auxiliary line 221 when the intake valve 2 is opened to the preset valve opening height; and finally, the value of H in the required tumble intensity range is determined. By constructing the design condition of H in the above manner, the airway structure is more conducive to obtaining the required tumble ratio.

In an embodiment, the height difference between the preset valve opening height and a maximum valve opening height of the intake valve is k. By simulating the relevant parameters of various types of commercially available Miller-profile engine, it can be concluded that the range of k value is preferably 0.3 to 0.4 times the maximum valve opening height of the intake valve. It should be noted that, the value of k is related to the preset tumble intensity node. In the actual application, the value of k may be selected based on the required tumble intensity range. It can be understood that the value range of k is only the preferred value range according to the embodiments of the present application for the common Miller-profile engines. In the actual application, other value ranges may also be selected based on actual needs, which is not limited here.

Figure 6:
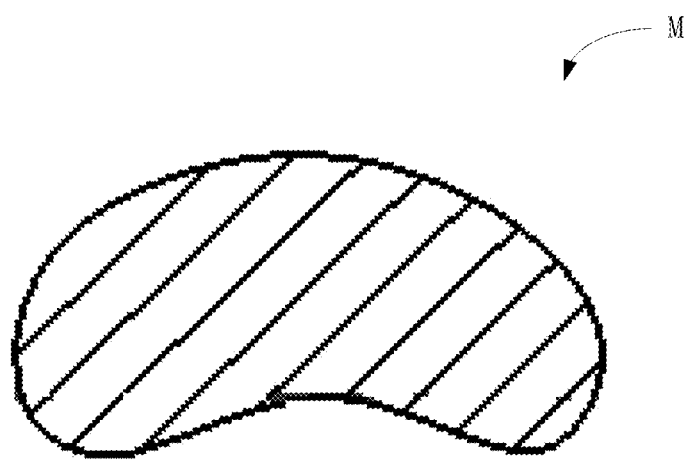
FIG. 6 is a schematic view showing a flow guiding cross section of an intake duct close to an intake throat of the intake duct according to an embodiment of the present application.

In some embodiments, referring to FIGS. 5 and 6, a flow guide cross section M (i.e. the cross section of the outlet edge of the intake duct 1) of the intake duct 1 close to the intake throat of the intake duct 1 is matched with the cross section of the outflow channel 9 formed on the outflow side 12 of the intake valve 2. It should be noted that the outflow channel 9 formed at the outflow side 12 of the intake valve 2 is a fluid channel defined by the revolution cone surface, located on the outflow side 12, of the intake valve disc 22 of the intake valve 2 and an inner ring guide surface of an intake seat ring 6. Those skilled in the art should be able to understand that, when the intake valve 2 is opened, a side of the intake duct 1 where the outflow of the intake duct 1 is smoothly guided by the intake valve disc 22 of the intake valve 2 is defined as the outflow side 12, and a side where the outflow of the intake duct 1 is blocked is defined as a blocking side 13. By designing the flow guide cross section M as described above, the flow on the outflow side 12 of the intake duct 1 is increased, which helps to improve the intake efficiency and tumble ratio. The shape of the flow guide cross section close to the intake throat of the intake duct 1 may be designed in an arched structure shown in FIG. 6. The arched structure facilitates the efficient intake on the outflow side 12 of the intake valve 2 and formation of a tumble flow when entering the cylinder. It can be understood that other structures may also be designed in practical applications, which is not limited here.

Figure 3:
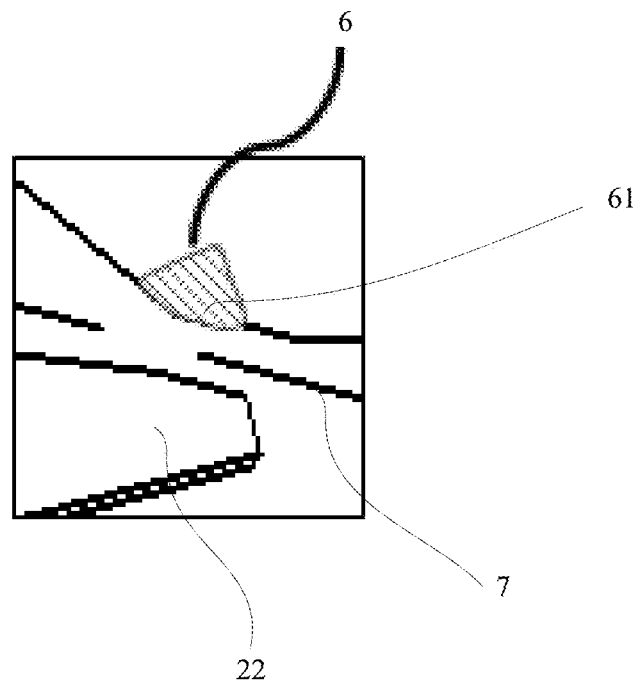
FIG. 3 is a partial schematic view of an outflow channel formed on an outflow side of an intake valve according to an embodiment of the present application.
Figure 8:
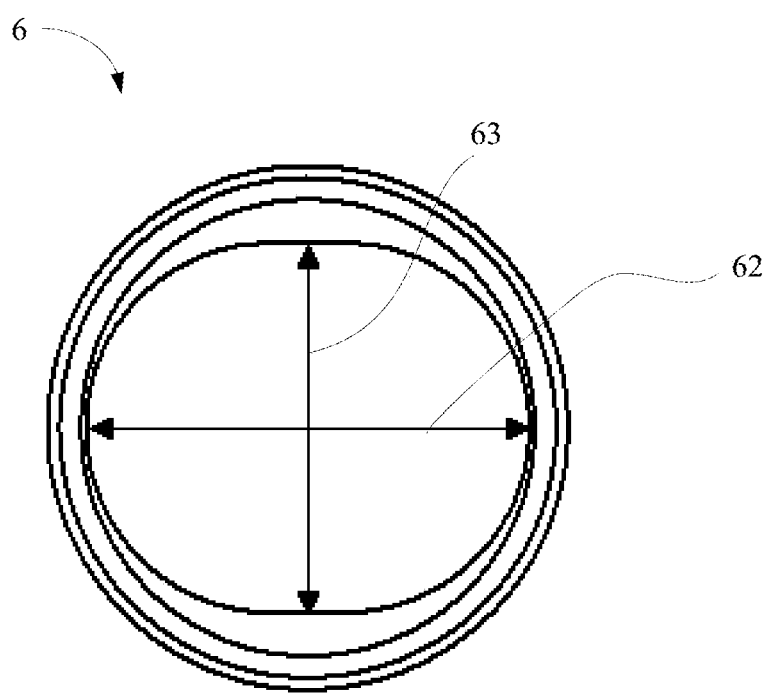
FIG. 8 is a schematic view showing a flow cross section of an intake seat ring which is in a shape of a long circle, according to an embodiment of the present application.
Figure 9:
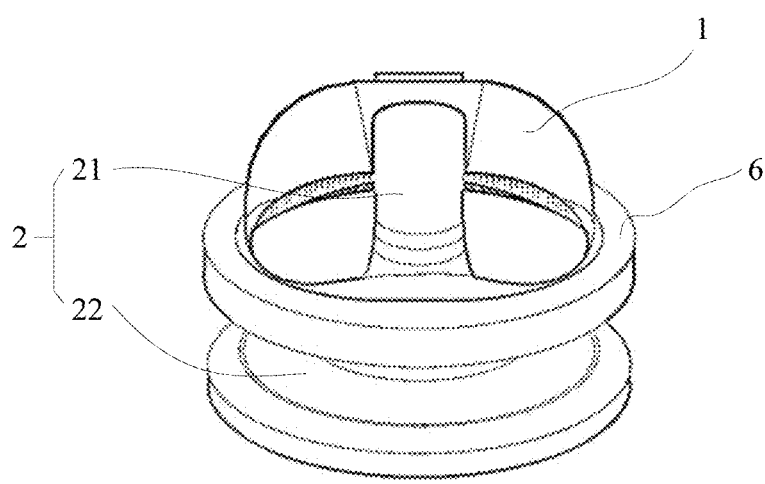
FIG. 9 is a schematic structural view of an intake valve and an intake seat ring when the intake valve is opened, according to an embodiment of the present application.

In some other embodiments, referring to FIG. 1 combined with FIGS. 3, 8, and 9, an intake seat ring 6 is provided at the intake throat of the intake duct 1, and the intake seat ring 6 is provided with a downward guide inclined surface 61 in smooth transition to an upper guide surface 14 of the intake duct 1. By arranging the downward guide inclined surface 61 on the intake seat ring 6 in smooth transition to the upper guide surface 14 of the intake duct 1, the blocking of the airflow on the outflow side 12 of the intake valve 2 by the intake seat ring 6 can be effectively reduced, and energy loss is reduced, which increases the effective flow cross section and improves the intake efficiency.

Figure 7:
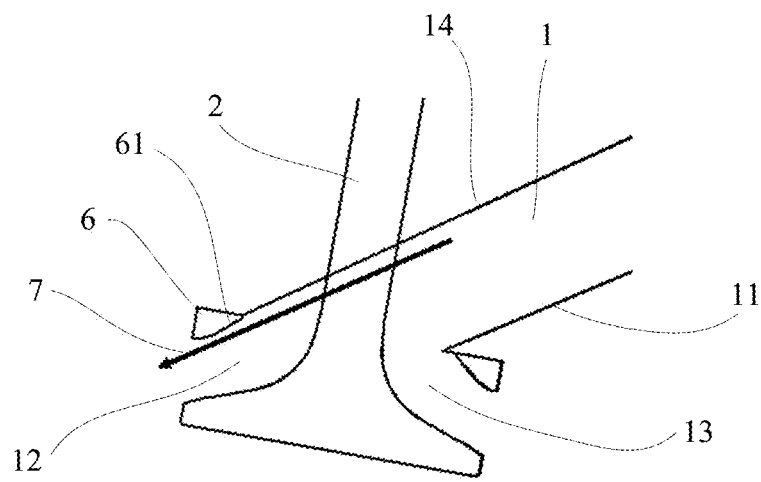
FIG. 7 is a schematic structural view showing an adjoining zone between a downward guide inclined surface on an intake seat ring and an upper guide surface of an intake duct, according to an embodiment of the present application.

In an embodiment, as shown in FIG. 7, the guide direction of the downward guide inclined surface 61 is preferably designed to be consistent with the guide direction of the upper guide surface 14 of the intake duct 1. By designing this structure, energy loss can be reduced to the maximum extent and the optimization effect of intake efficiency is improved.

In some embodiments, as shown in FIGS. 8 and 9, the flow cross section of the intake seat ring 6 is preferably designed to be in a shape of a long circle, that is, the inner ring cross section of the intake seat ring 6 is designed to be in a shape of a long circle, and a length direction 62 of a long circle is perpendicular to the outflow direction 7 of the intake duct 1. Those skilled in the art should be able to understand that the long circle has a length direction 62 and a width direction 63. The width direction 63 is the distance between two straight segments of the long circle, and the length direction 62 is the direction perpendicular to the width direction 63 and is also the direction connecting the centers of two opposite arcs of the long circle. By designing the long-circular flow cross section, the blocking of the intake flow by the intake seat ring 6 can be effectively reduced while meeting the requirements of arranging the downward guide inclined surface 61 on the intake seat ring 6, which increases the effective flow area of the airflow. It can be understood that the flow cross section of the intake seat ring 6 is preferably obround, which is only a preferred example of the present application. In practical applications, other shapes may also be selected based on other arrangement requirements, for example, a specially-shaped structure obtained through simulation optimization, which is not specifically limited here.

In addition, a cylinder cover is also provided according to the present application, which including the airway structure described above in any embodiment. Since the airway structure has the above technical effects, the cylinder cover including the airway structure also has the corresponding technical effects, which is not repeated here.

In addition, a Miller-profile engine is also provided according to the present application, which includes the cylinder cover described above. Since the cylinder cover has the above technical effects, the Miller-profile engine including the cylinder cover also has the corresponding technical effects, which is not repeated here.

It should be noted that, the embodiments in the specification are described in a progressive manner, each embodiment focuses on the difference from other embodiments, and same and similar parts in each embodiment may be referred to each other.

As shown in the present application and the claims, unless exceptions are clearly indicated in the context, the words such as "a", "an", "one" and/or "the" do not specifically refer to the singular, but may also include the plural. Generally speaking, the terms "include" and "comprise" only imply the inclusion of steps and elements that have been clearly identified, these steps and elements do not constitute an exclusive list, and a method or a device may further include other steps or elements. An element limited by the statement "comprises a . . . " does not exclude the existence of other identical elements in a process, method, product, or device that includes the element.

Specific embodiments are used herein to illustrate the principles and the implementations of the present application, and the descriptions of the above embodiments are only used to help understand the core idea of the present application. It should be pointed out that for those skilled in the art, some improvements and modifications may be made to the present application without departing from the principles of the present application, and these improvements and modifications shall fall within the protection scope of the claims of the present application.

The invention claimed is:

1. An airway structure for a Miller-profile engine, comprising:
   an intake duct and an intake valve cooperated with the intake duct, which are provided on an intake side of a cylinder cover;
   an exhaust duct and an exhaust side roof, which are provided on an exhaust side of the cylinder cover; wherein
   an inclination angle of an axis of an intake valve stem of the intake valve relative to an assembly bottom surface of the cylinder cover is a1, an included angle between a revolution cone surface of an intake valve disc of the intake valve and the axis of the intake valve stem is a2, an included angle between a plane where the exhaust side roof is located and the assembly bottom surface of the cylinder cover is a3, a lower guide surface of the intake duct close to an intake throat of the intake duct is inclined downward relative to the assembly bottom surface, and an inclination angle of the lower guide surface relative to the assembly bottom surface is a4; and
   the airway structure satisfies: a3-3°≤a1-a2≤a3+3°; and/or, a4-3°≤a1-a2≤a4+3°.

2. The airway structure according to claim 1, wherein a distance between an outlet edge of the lower guide surface and the assembly bottom surface is H; the intake valve has a preset valve opening height when intensity of tumble formed by intake airflow of the intake duct introduced into a cylinder reaches a preset tumble intensity node; a plane formed by the axis of the intake valve stem of the intake valve and an axis of an exhaust valve stem of an exhaust valve on the exhaust side is defined as an auxiliary plane, and a line formed by intersection of the revolution cone surface of the intake valve disc of the intake valve and the auxiliary plane on an outflow side of the intake valve is defined as an auxiliary line;
   H satisfies a design condition that:
   an outflow extension line of the lower guide surface extending from the outlet edge coincides with an auxiliary line when the intake valve is opened to the preset valve opening height.

3. The airway structure according to claim 2, wherein a height difference between the preset valve opening height and a maximum valve opening height of the intake valve is k, and a value range of k is 0.3 to 0.4 times a maximum valve opening height of the intake valve.

4. The airway structure according to claim 1, wherein a flow guide cross section of the intake duct close to the intake throat of the intake duct is matched with a cross section of an outflow channel formed on an outflow side of the intake valve.

5. The airway structure according to claim 4, wherein the flow guide cross section of the intake duct close to the intake throat of the intake duct is arched.

6. The airway structure according to claim 1, wherein an intake seat ring is provided at the intake throat of the intake duct, and the intake seat ring is provided with a downward guide inclined surface in smooth transition to an upper guide surface of the intake duct.

7. The airway structure according to claim 6, wherein a guide direction of the downward guide inclined surface is consistent with a guide direction of the upper guide surface of the intake duct.

8. The airway structure according to claim 6, wherein a flow cross section of the intake seat ring is in a shape of a long circle, and a length direction of the long circle is perpendicular to an outflow direction of the intake duct.

9. A cylinder cover comprising an airway structure for a Miller-profile engine, wherein
   the airway structure comprises:
   an intake duct and an intake valve cooperated with the intake duct, which are provided on an intake side of a cylinder cover;
   an exhaust duct and an exhaust side roof, which are provided on an exhaust side of the cylinder cover; and wherein
   an inclination angle of an axis of an intake valve stem of the intake valve relative to an assembly bottom surface of the cylinder cover is a1, an included angle between a revolution cone surface of an intake valve disc of the intake valve and the axis of the intake valve stem is a2, an included angle between a plane where the exhaust side roof is located and the assembly bottom surface of the cylinder cover is a3, a lower guide surface of the intake duct close to an intake throat of the intake duct is inclined downward relative to the assembly bottom surface, and an inclination angle of the lower guide surface relative to the assembly bottom surface is a4; and
   the airway structure satisfies: a3-3°≤a1-a2≤a3+3°; and/or, a4-3°≤a1-a2≤a4+3°.

10. The cylinder cover according to claim 9, wherein a distance between an outlet edge of the lower guide surface and the assembly bottom surface is H; the intake valve has a preset valve opening height when intensity of tumble formed by intake airflow of the intake duct introduced into a cylinder reaches a preset tumble intensity node; a plane formed by the axis of the intake valve stem of the intake valve and an axis of an exhaust valve stem of an exhaust valve on the exhaust side is defined as an auxiliary plane, and a line formed by intersection of the revolution cone surface of the intake valve disc of the intake valve and the auxiliary plane on an outflow side of the intake valve is defined as an auxiliary line;
    H satisfies a design condition that:
    an outflow extension line of the lower guide surface extending from the outlet edge coincides with an auxiliary line when the intake valve is opened to the preset valve opening height.

11. The cylinder cover according to claim 10, wherein a height difference between the preset valve opening height and a maximum valve opening height of the intake valve is k, and a value range of k is 0.3 to 0.4 times a maximum valve opening height of the intake valve.

12. The cylinder cover according to claim 9, wherein a flow guide cross section of the intake duct close to the intake throat of the intake duct is matched with a cross section of an outflow channel formed on an outflow side of the intake valve.

13. The cylinder cover according to claim 12, wherein the flow guide cross section of the intake duct close to the intake throat of the intake duct is arched.

14. The cylinder cover according to claim 9, wherein an intake seat ring is provided at the intake throat of the intake duct, and the intake seat ring is provided with a downward guide inclined surface in smooth transition to an upper guide surface of the intake duct.

15. The cylinder cover according to claim 14, wherein a guide direction of the downward guide inclined surface is consistent with a guide direction of the upper guide surface of the intake duct.

16. The cylinder cover according to claim 14, wherein a flow cross section of the intake seat ring is in a shape of a long circle, and a length direction of the long circle is perpendicular to an outflow direction of the intake duct.

17. A Miller-profile engine comprising the cylinder cover according to claim 9.

* * * * *